(12) United States Patent
Andrei et al.

(10) Patent No.: US 12,331,649 B2
(45) Date of Patent: Jun. 17, 2025

(54) GAS TURBINE NOZZLES WITH COOLING HOLES AND TURBINE

(71) Applicant: NUOVO PIGNONE TECNOLOGIE—S.R.L., Florence (IT)

(72) Inventors: Luca Andrei, Florence (IT); Irene Cresci, Florence (IT); Simone Cubeda, Florence (IT); Fabrizio Paone, Florence (IT); Girolamo Tripoli, Florence (IT)

(73) Assignee: Nuovo Pignone Tecnologie—S.R.L., Florence (IT)

( * ) Notice: Subject to any disclaimer, the term of this patent is extended or adjusted under 35 U.S.C. 154(b) by 0 days.

(21) Appl. No.: 18/730,937

(22) PCT Filed: Jan. 20, 2023

(86) PCT No.: PCT/EP2023/025028
§ 371 (c)(1),
(2) Date: Jul. 22, 2024

(87) PCT Pub. No.: WO2023/143864
PCT Pub. Date: Aug. 3, 2023

(65) Prior Publication Data
US 2025/0101883 A1    Mar. 27, 2025

(30) Foreign Application Priority Data
Jan. 27, 2022    (IT) ................. 102022000001355

(51) Int. Cl.
*F01D 25/12*    (2006.01)
*B33Y 80/00*    (2015.01)
(Continued)

(52) U.S. Cl.
CPC ............. *F01D 25/12* (2013.01); *F01D 5/186* (2013.01); *F01D 9/041* (2013.01); *B33Y 80/00* (2014.12);
(Continued)

(58) Field of Classification Search
CPC .......... F01D 25/12; F01D 5/186; F01D 9/041; B33Y 80/00; F05D 2240/81; F05D 2260/202
See application file for complete search history.

(56) References Cited

U.S. PATENT DOCUMENTS 4,946,346 A * 8/1990 Ito ............................ F01D 5/189
415/115
5,382,135 A * 1/1995 Green ....................... F01D 5/18
415/115
(Continued)

FOREIGN PATENT DOCUMENTS

| RU | 2566877 C2 | 10/2015 |
| RU | 2666385 C1 | 9/2018 |
| RU | 199563 U1 | 9/2020 |

OTHER PUBLICATIONS

Safran (Nov. 23, 2020) "Siemens uses AM to create a turbine blade with internal cooling channels and improved efficiency", [Video], YouTube.

*Primary Examiner* — Brian Christopher Delrue
(74) *Attorney, Agent, or Firm* — Paul Frank + Collins P.C.

(57) ABSTRACT

The nozzle segment for a gas turbine comprises an inner platform and an outer platform as well as a plurality of airfoils arranged between the inner platform and the outer platform. A set of platform film cooling holes are provided, including at least one inner platform film cooling hole on a surface of the inner platform or on a surface of the outer platform facing said hot gas flow passage. A ratio between (Continued)

a distance in tangential direction of the platform film cooling hole from the pressure side of the respective airfoil and a width of the hot gas flow passage in tangential direction at the platform film cooling hole is comprised between 0 and 0.5.

20 Claims, 4 Drawing Sheets

(51) Int. Cl.
    *F01D 5/18*     (2006.01)
    *F01D 9/04*     (2006.01)

(52) U.S. Cl.
    CPC .... *F05D 2240/81* (2013.01); *F05D 2260/202* (2013.01)

(56) References Cited

U.S. PATENT DOCUMENTS

| | | | |
|---|---|---|---|
| 6,206,638 B1 * | 3/2001 | Glynn | F01D 5/187 415/115 |
| 7,249,933 B2 * | 7/2007 | Lee | F01D 5/143 416/193 A |
| 7,806,650 B2 * | 10/2010 | Heyward | F01D 9/041 415/115 |
| 8,245,519 B1 * | 8/2012 | Liang | F01D 5/186 415/115 |
| 10,010,937 B2 | 7/2018 | Bunker | |
| 10,533,425 B2 * | 1/2020 | McMahon | F01D 9/065 |
| 10,662,780 B2 * | 5/2020 | LoRicco | F01D 9/041 |
| 10,731,487 B2 | 8/2020 | Dutta et al. | |
| 10,808,548 B2 | 10/2020 | Whitfield et al. | |
| 12,018,587 B1 * | 6/2024 | Morton | F01D 25/12 |
| 2006/0171807 A1 * | 8/2006 | Lee | F01D 5/186 416/97 R |
| 2008/0031738 A1 * | 2/2008 | Lee | F01D 5/186 416/97 R |
| 2008/0056907 A1 | 3/2008 | Heyward et al. | |
| 2010/0119377 A1 * | 5/2010 | Tibbott | F01D 5/186 416/97 R |
| 2013/0205787 A1 * | 8/2013 | Zelesky | F01D 9/065 415/173.1 |
| 2015/0174707 A1 * | 6/2015 | Li | B23K 1/00 427/142 |
| 2015/0377032 A1 * | 12/2015 | Lewis | F01D 5/186 415/177 |
| 2016/0032764 A1 * | 2/2016 | Tibbott | F01D 9/047 415/116 |
| 2016/0076382 A1 * | 3/2016 | Devore | F01D 9/041 415/173.1 |
| 2016/0146019 A1 * | 5/2016 | Pizano | F01D 9/041 29/889.721 |
| 2016/0273364 A1 * | 9/2016 | Bergholz | F01D 5/186 |
| 2017/0101870 A1 * | 4/2017 | Lewis | F01D 5/186 |
| 2018/0010465 A1 * | 1/2018 | Xu | F23R 3/06 |
| 2019/0085706 A1 * | 3/2019 | Webster | F01D 9/041 |
| 2019/0211688 A1 * | 7/2019 | LoRicco | F01D 9/065 |
| 2019/0211690 A1 * | 7/2019 | LoRicco | F01D 5/186 |
| 2020/0165921 A1 * | 5/2020 | Spangler | F01D 5/189 |
| 2021/0222568 A1 | 7/2021 | Snider | |

* cited by examiner

GAS TURBINE NOZZLES WITH COOLING HOLES AND TURBINE

TECHNICAL FIELD

The present disclosure concerns gas turbine engines. Specifically, disclosed herein are turbine components requiring film cooling, such as stationary inlet gas nozzles arranged between the combustor and the high pressure turbine wheel.

BACKGROUND ART

To improve thermal efficiency of gas turbine engines, high combustion temperatures are desirable, since the thermal efficiency increases when increasing the high temperature of the thermodynamic cycle.

High combustion gas temperatures require cooling of the turbine components which are most near to the combustion chamber, i.e. the combustor, typically the first stage nozzles, wherethrough high-pressure and high-temperature combustion gas from the combustion chamber flows toward the first turbine wheel of the high-pressure turbine. Commonly, in order to prevent or reduce thermal damages and wear of the components, through which the hot combustion gas flows, film cooling of said components is used. Film cooling is achieved by delivering cooling air through holes manufactured in the turbine component and having a hole exit at the surface to be cooled of the turbine component. These holes are commonly referred to as "film cooling holes" or "film holes".

Film cooling holes are usually manufactured in the airfoil profiles of the stationary nozzles located between the combustion chamber and the high-pressure turbine wheel. In some turbines, film cooling holes are also provided in concentrically arranged inner and outer platforms, between which the airfoil profiles are located to form gas flow passages.

Cooling efficiency may be affected by the position and orientation of the film cooling hole with respect to the airfoils.

There is a need for improved cooling holes design, in order to ameliorate the cooling efficiency, such that higher temperatures of the thermodynamic cycle and/or reduced thermal damages to the turbine components can be achieved.

SUMMARY

Disclosed herein is a turbine component, and more specifically a nozzle segment (nozzle sector) for a gas turbine, including two or more airfoils, which define one or more nozzles. One or a plurality of nozzle segments are arranged circumferentially around a turbine axis, to form the first set of stationary high-pressure nozzles, which guide a flow of hot and pressurized combustion gas into the first turbine wheel.

In embodiments disclosed herein, the nozzle segment includes an inner platform and an outer platform. The airfoils are arranged between the inner platform and the outer platform.

The inner platform, the outer platform and the airfoils are manufactured as a single monolithic component, by additive manufacturing.

Each airfoil comprises a leading edge, a trailing edge, a pressure side and a suction side. Each pair of sequentially arranged airfoils form a nozzle, i.e., a hot gas flow passage.

More specifically, each hot gas flow passage is formed between the inner platform, the outer platform, the suction side of one airfoil and the pressure side of another adjacent airfoil.

The nozzle segment further includes film cooling holes, including at least one inner film cooling hole in each flow passage, located either on a surface of the inner platform, or on a surface of the outer platform, or both, facing the respective hot gas flow passage.

The film cooling holes are formed when the nozzle segment is generated by additive manufacturing, i.e. they are generated by additive manufacturing, such that mechanical constraints of other manufacturing methods, such as drilling or electrical discharge machining (EDM) are overcome.

To improve cooling efficiency, the film cooling holes are shaped film cooling holes and are arranged such that the ratio between a distance in tangential direction of the film cooling hole from the pressure side of the respective airfoil and a width of the hot gas flow passage in tangential direction at the film cooling hole is comprised between 0 and 0.5. Moreover, the stagger complementary angle of each airfoil is equal to or less than 85°. Additionally, the ratio between a vane passage width and an axial chord of each said flow passage is comprised between 0 and 0.5.

A "shaped film cooling hole", also referred to as a "diffusion shaped hole" or "diffusion cooling hole", is a hole the exit end whereof is neither circular nor elliptical, but has a diverging shape to help the cooling flow diffusion. Shaped film cooling hole improve cooling efficiency by providing greater surface coverage of the components to be cooled. A typical shaped film cooling hole consists of a first channel portion being cylindrical, then may have an increasing cross section in an upstream-to-downstream direction in the proximity of the exit end.

Cooling holes meeting the geometrical conditions outlined above proved surprisingly beneficial in improving cooling efficiency of the airfoils. In fact, due to the pressure gradient between the pressure side and the suction side of adjacent airfoils, coolant flowing from the cooling holes in the platform surface tends to move away from the pressure side and to migrate towards the suction side of the opposite airfoil. This results in poor thermal protection of the pressure side of the airfoil. Arranging the film cooling holes near the pressure side of the airfoil improves the cooling efficiency of the pressure side of the airfoil. This positioning, in combination with the use of shaped film cooling holes provides a synergic effect in that the diffusive effect of the shaped film cooling hole is applied adjacent the pressure side of the airfoil. The position and the diffusive effect promote the cooling effect of the pressure side of the airfoil, in spite of the pressure gradient of the gas flowing between adjacent airfoils, which tends to cause the cooling air to migrate away from the pressure side towards the suction side of the adjacent airfoil.

In addition to the shaped film cooling holes meeting the above geometrical condition, additional film cooling holes can be provided in one or more flow passages, which do not meet the condition mentioned above, i.e., which can be nearer to a centerline of the flow passage, or even be placed more leftwards on the inner and/or outer platform surface with a forward-looking aft view of the nozzle segment.

Further features and embodiments will be described below, reference being made to the accompanying drawings, and are set forth in the attached claims.

BRIEF DESCRIPTION OF THE DRAWINGS

Reference is now made briefly to the accompanying drawings, in which.

DETAILED DESCRIPTION

Figure 1:
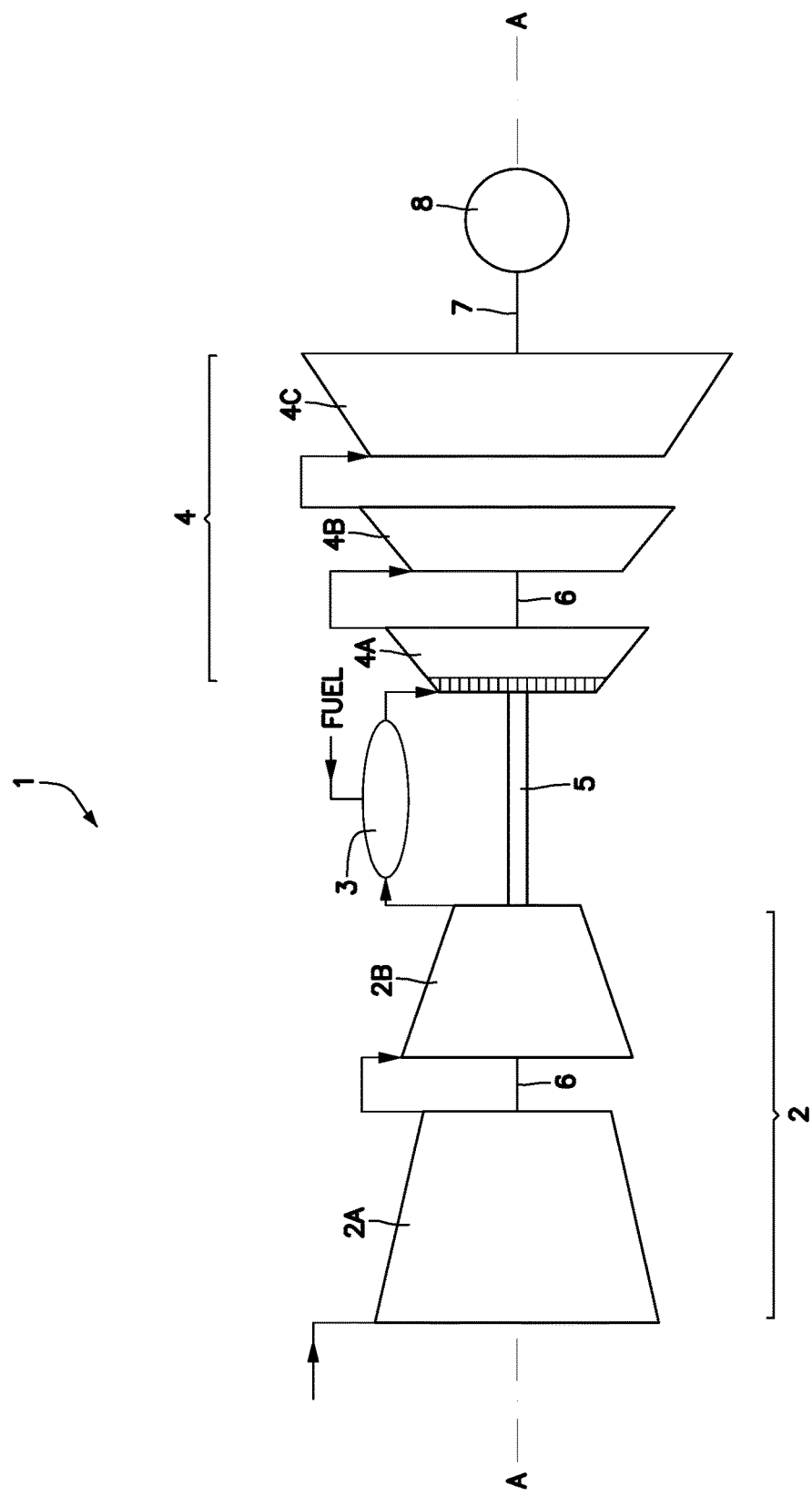
FIG. 1 is a schematic of an aeroderivative gas turbine engine, wherein turbine components according to the present disclosure can be used.

FIG. 1 illustrates a schematic of an exemplary gas turbine engine 1, in which nozzle segments according to the present disclosure can form the stationary nozzles between the combustor and the high-pressure turbine wheel.

The gas turbine engine 1 of FIG. 1 is an aeroderivative gas turbine engine including a compressor section 2, a combustor 3 and a turbine section 4. The gas turbine engine 1 is shown as an example of a gas turbine engine, in which turbine components according to the present disclosure can be used. Those skilled in the art of turbomachinery will nevertheless understand that advantageous features of the nozzle segments according to the present disclosure can be used in gas turbine engines of different structure and nature, for instance including a different number of turbine wheels, compressors and shafts.

In the exemplary embodiment of FIG. 1, the compressor section 2 includes a low-pressure compressor 2A and a high-pressure compressor 2B. In the exemplary embodiment of FIG. 1 the turbine section 4 includes a high-pressure turbine 4A, a low-pressure turbine 4B and a power turbine 4C. The high-pressure turbine 4A is drivingly coupled through a first shaft 5 to the high-pressure compressor 2B, such that power generated by the high-pressure turbine 4A drives the high-pressure compressor 2B. The low-pressure turbine 4B is drivingly coupled through a second shaft 6 to the low-pressure compressor 2A, such that power generated by the low-pressure turbine 4B drives the low-pressure compressor 2A. A third shaft 7 drivingly couples the power turbine 4C to the load, which can include a gas compressor or compressor train, an electric generator, or any other kind of driven machinery.

Compressed air delivered by the compressor section 2 to the combustor 3 is mixed with fuel and the fuel-air blend is combusted to generate a flow of hot and pressurized combustion gas, which sequentially expands in the high-pressure turbine 4A, in the low-pressure turbine 4B and in the power turbine 4C to generate power which drives the compressor section 2 and the load 8.

The flow of hot pressurized combustion gas from the combustor 3 is delivered to the high-pressure turbine 4A through a set of annularly arranged stationary airfoils which, along with an inner platform and an outer platform, form nozzles, schematically shown at 4D, which guide the combustion gas towards the turbine wheel.

The annular arrangement of nozzles can be formed by a sequence of nozzle segments arranged annularly around the axis A-A of the gas turbine engine 1. Each nozzle segment can include an inner platform and an outer platform and a plurality of airfoils arranged therebetween, for instance a first airfoil and a second airfoil. The reference to "first" and "second" airfoil is conventional, only aimed at distinguishing one airfoil from the other and shall not be interpreted as limiting the disclosure in any way.

Figure 2:
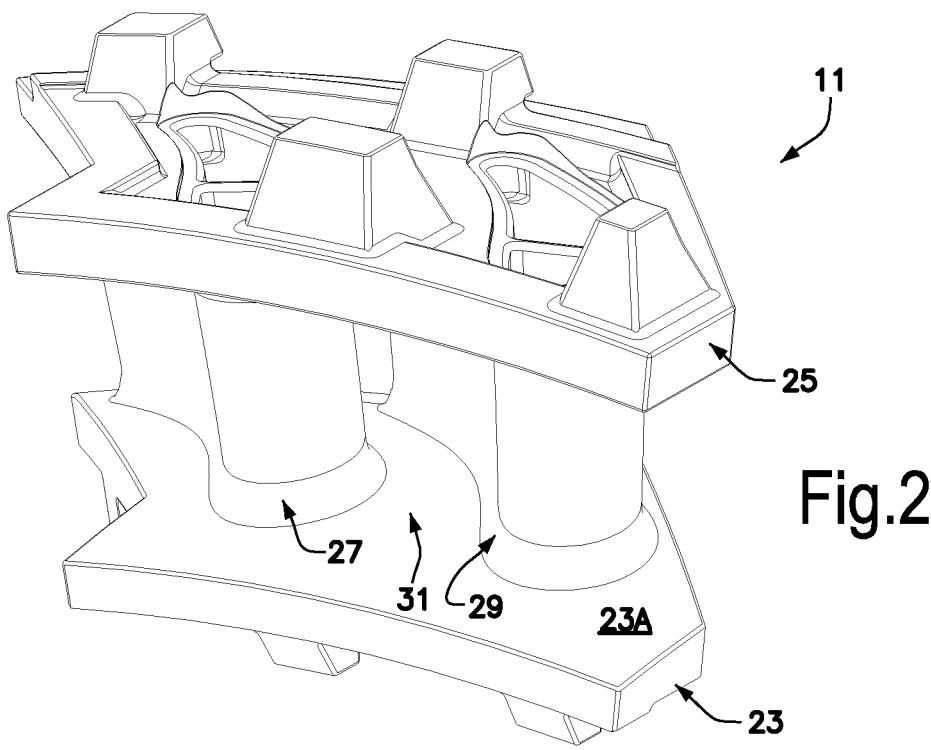
FIGS. 2, 3, 4 and 5 show axonometric views of a nozzle segment according to the present disclosure.
Figure 3:
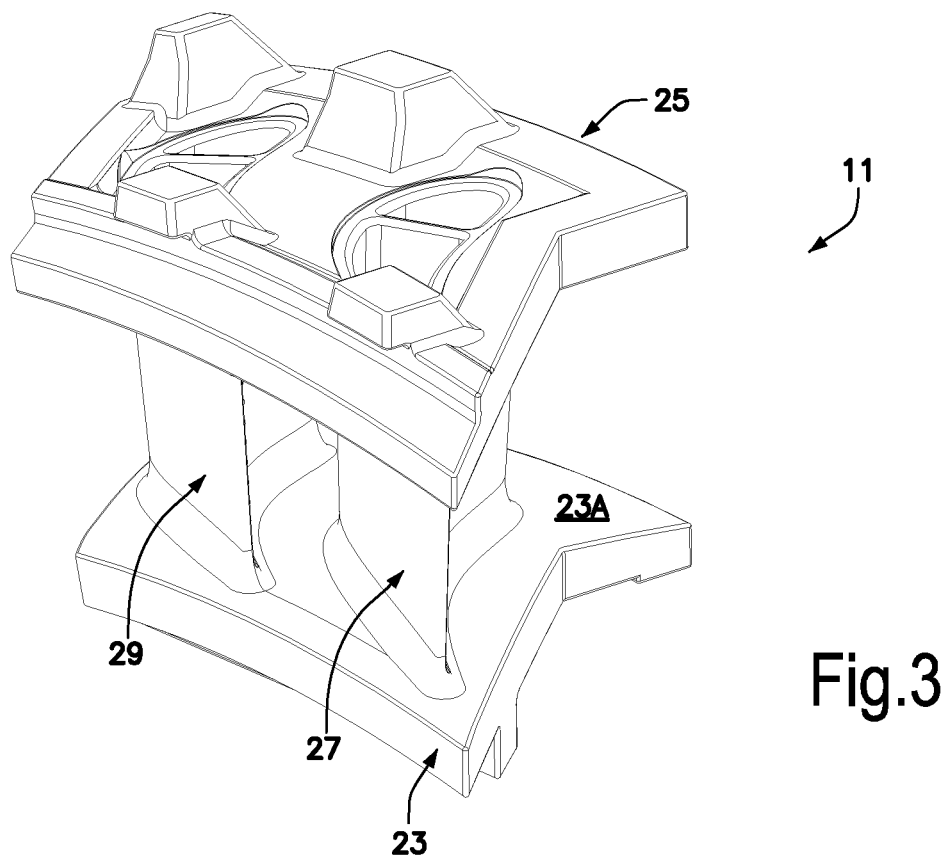
Figure 4:
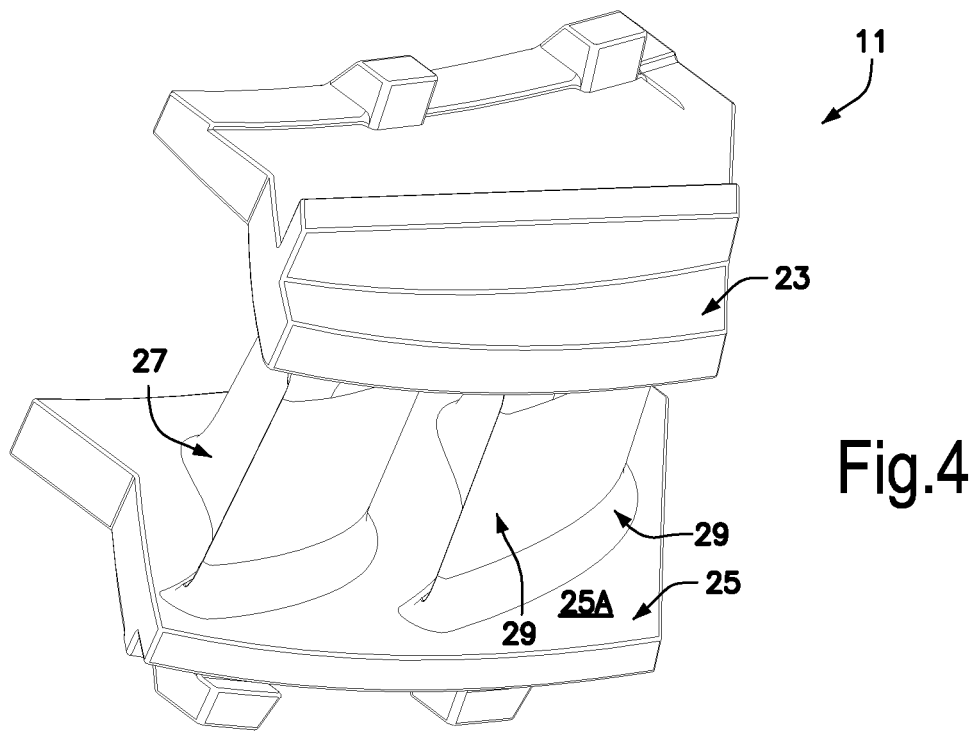
Figure 5:
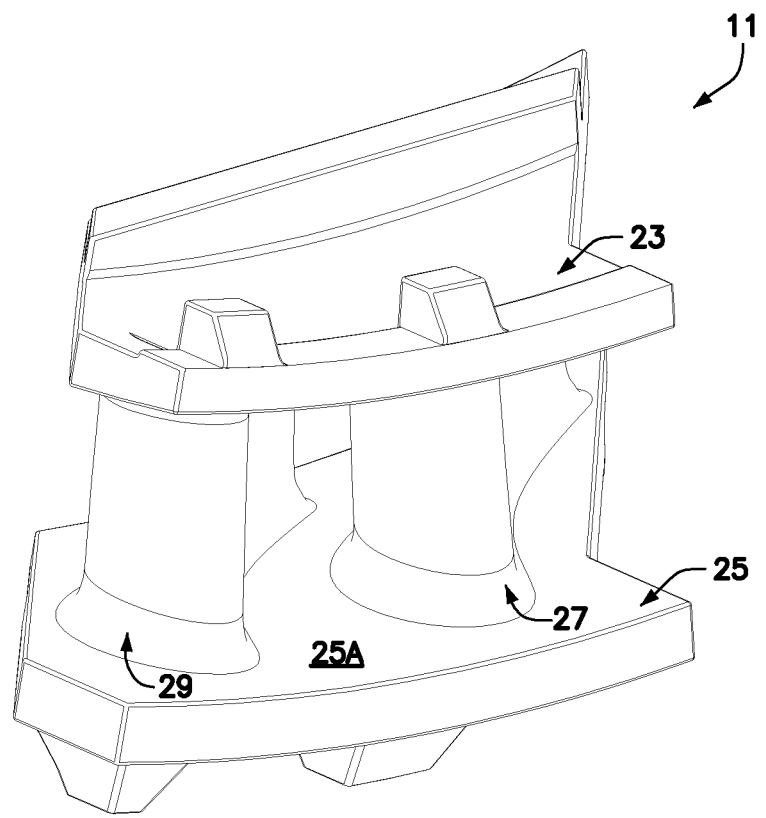

FIGS. 2, 3, 4, 5 and 6 show in detail one of the nozzle segments labeled 11, which, when assembled, form the annular arrangement of gas nozzles 4D. While in the embodiment illustrated herein each nozzle segment includes two airfoils, in other embodiments, more than two airfoils can be included in each nozzle segment. More specifically, FIGS. 2 and 3 show axonometric views from the inlet side and from the outlet side, respectively, of the nozzle segment with the inner platform on the bottom side of the figures. FIGS. 4 and 5 show axonometric views from the inlet side and from the outlet side, respectively, of the same nozzle segment with the outer platform on the bottom side of the figures.

More specifically, the nozzle segment 11 comprises an inner platform or inner platform portion 23 and an outer platform or outer platform portion 25. When a plurality of nozzle segments 11 are assembled together in an annular arrangement surrounding the turbine axis A-A, the inner platforms or inner platform portions 23 of the nozzle segments 11 form the complete annular inner platform of the gas inlet nozzles of the high-pressure turbine. Similarly, the outer platforms or outer platform portions 25 of the nozzle segments 11 form the complete annular outer platform of the gas inlet nozzles of the high-pressure turbine.

Here below the elements 23 and 25 will be referred to shortly as inner platform and outer platform, respectively, even though they may represent only a portion of the complete inner and outer platform.

Figure 6:
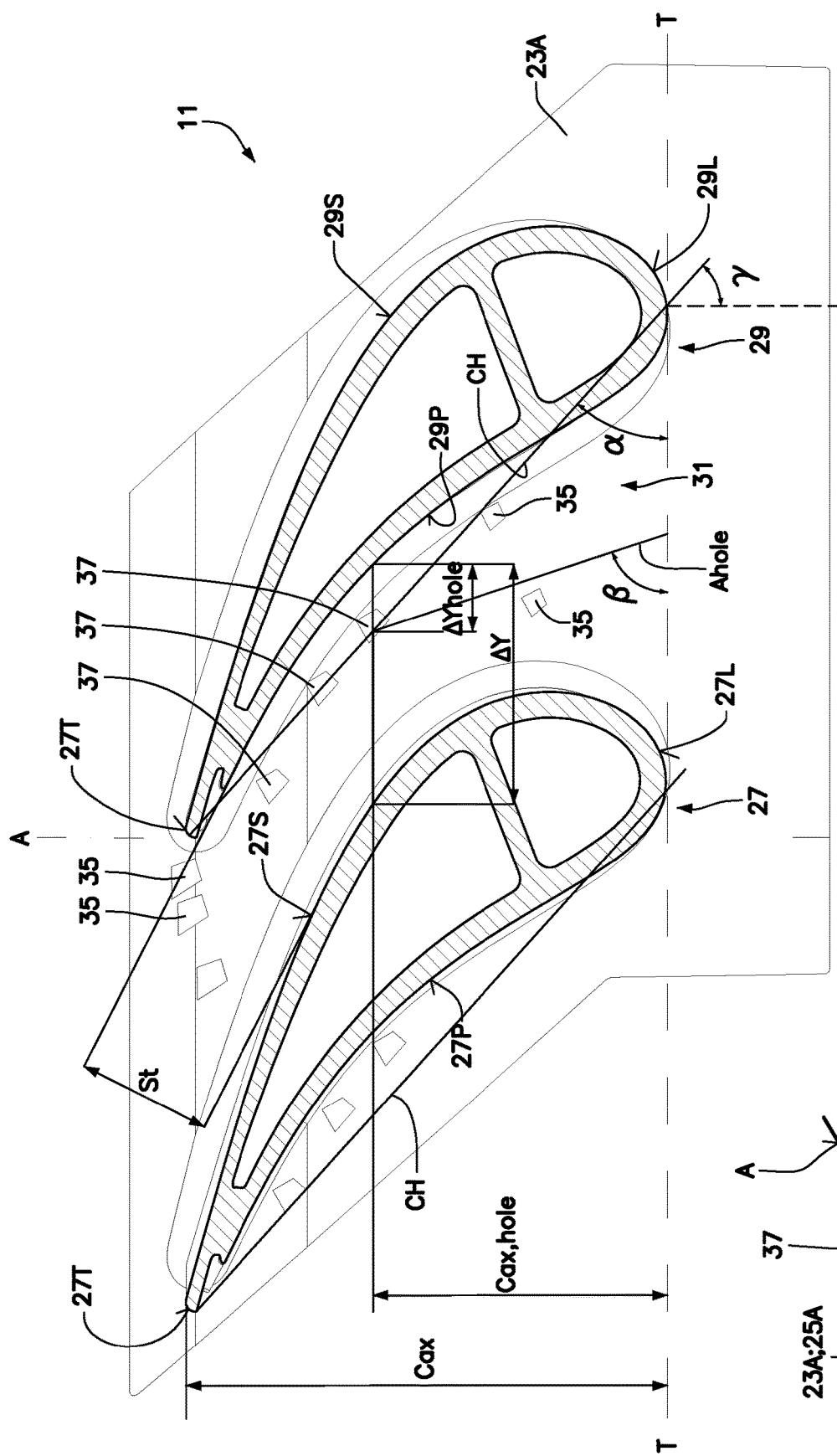
FIG. 6 is a schematic sectional view of the hot gas flow passage formed in the nozzle segment of FIGS. 2, 3, 4 and 5.

A first airfoil 27 and a second airfoil 29 are positioned between the inner platform 23 and the outer platform 25 and extend from the surface 23A of the inner platform 23 facing the outer platform 25 to the surface 25A of the outer platform 25 facing the inner platform 23. As shown in FIG. 6, the first airfoil 27 has a suction side 27S and a pressure side 27P. Specifically, the suction side 27S has a convex shape, while the pressure side 27P has a concave shape. The suction side 27S and the pressure side 27P merge forming a leading edge 27L and a trailing edge 27T of the first airfoil 27. Similarly, the second airfoil 29 has a convex suction side 29S and a concave pressure side 29P. The suction side 29S and the pressure side 29P merge at a leading edge 29L and at a trailing edge 29T of the second airfoil 29.

A hot gas flow passage 31 extends between the suction side 27S of the first airfoil 27, the pressure side 29P of the second airfoil 29 and the surfaces 23A, 25A facing each other of the inner platform 23 and of the outer platform 25.

The first airfoil 23 and the second airfoil 29 are preferably equal to one another, as shown in the drawings.

Cooling air which flows through suitable channeling in the interior of the first airfoil 27 and second airfoils 29 can be delivered to conventional film cooling holes on the airfoil surfaces, not shown.

In addition to conventional cooling holes on the airfoils 27, 29, nozzle segment 11 comprises conventional film cooling holes 35 on the inner and outer platforms 23, 25, arranged near the inlet and the outlet of the hot gas flow passage 31.

According to the present disclosure, at least an additional set of film cooling holes, including at least one platform film cooling hole 37, is provided in either or both the inner platform 23 and the outer platform 25, in positions near the pressure side 29P of the second airfoil 29, i.e., near the concave surface of the second airfoil profile 29, which faces the interior of the hot gas flow passage 31. In the embodiment shown three additional platform film cooling holes 37 are provided, in three positions along the direction of the hot gas flow passage 31. In other embodiments, the at least one platform film cooling hole can be provided in the inner platform 23 only or in the outer platform 25 only.

The platform film cooling holes 37 are better shown in FIG. 6, which shows a cross-sectional view of the nozzle segment 11 along a surface extending between the inner platform 23 and the outer platform 25 and parallel thereto. Since the features of the nozzle segment 11, which will be referred here below and refer to the platform film cooling holes 37 can be duplicated on both the inner platform 23 and on the outer platform 25, FIG. 6 can show either one or the other of the inner and the outer platform surfaces 23A, 25A. For the sake of brevity and convenience, here below FIG. 6 will be considered as representing the surface 23A of the inner platform 23. It shall however be understood that the parameters which will be defined below and the position of the platform film cooling holes described here after can be referred similarly to the outer platform. 25 In other words, the outer platform 25 can be provided with an arrangement of platform film cooling holes 37 similar to the arrangement of platform film cooling holes 37 provided on the inner platform 23. It shall be understood, however, that the position of the platform film cooling holes 37 on the inner platform 23 can be different from the position of the platform film cooling holes 37 on the outer platform 25, provided that the geometrical constraints described here below are met.

Figure 7:
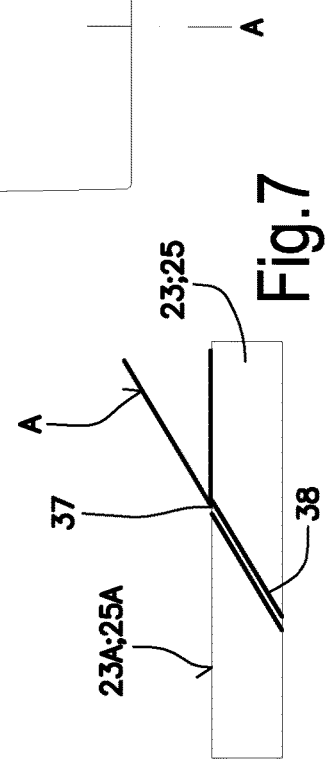
FIG. 7 schematically represents a cross sectional view of one of the inner and outer platforms along the axis of a film cooling duct.

In some embodiments, each platform film cooling hole 37 can be a shaped hole, as shown in FIG. 6. Each platform film cooling hole 37, as understood herein, is the exit end of a film cooling duct which extends through the thickness of the respective inner platform 23 or outer platform 25. FIG. 7 schematically represents a cross sectional view of one of the inner and outer platforms 23, 25 taken along the axis of a film cooling duct 38, ending with the platform film cooling hole 37.

The position of each platform film cooling hole 37 is selected for maximum cooling performance. Before defining the position of each platform film cooling hole 37, some parameters of the nozzle segment 11 and of the platform film cooling holes 37 will be defined, reference being specifically made to FIG. 6, where the chain dotted line A-A indicates the axial direction, i.e., the direction parallel to the axis A-A of the gas turbine engine 1 (see also FIG. 1). For the sake of drawing clarity, the geometrical parameters, which will be described below and which define the position of the platform film cooling holes 37, are indicated in FIG. 6 only for the intermediate platform film cooling hole 37.

Turning now to the definitions of the geometrical parameters, which will be used below to define the shape and position of the platform film cooling holes 37, the "axial direction" represented by the chain-dotted line A-A is a direction parallel to the axis A-A of the gas turbine engine 1 when the nozzle segment 11 is mounted on the gas turbine engine 1. The tangential direction pictorially represented by the chain-dotted line T-T is a direction orthogonal to the axial direction A-A. Cax is the distance between the trailing edge 27T, 29T and the leading edge 27L, 29L of each airfoil 27, 29 in the axial direction A-A and is referred to as "axial chord".

Cax,hole is the distance, in the axial direction A-A, of the platform film cooling hole 37 from the leading edge 27L and 29L of the first airfoil 27 and of the second airfoil 29.

Reference St indicates the vane passage width, referred to also as the width of the throat or opening of the vane passage, i.e., of the hot gas flow passage 31 at the trailing edge 29T of the second airfoil 29. I.e., the vane passage width is the distance between the trailing edge 29T of the second airfoil 29 from the suction side 27S of the first airfoil 27.

Δy is the distance in the tangential direction between the suction side 27S of the first airfoil 27 and the pressure side 29P of the second airfoil 29 along a line (orthogonal to the axial direction A-A, i.e., in the tangential direction) passing through the center of the platform film cooling hole 37.

Δyhole is the distance, along the tangential direction, between the center of the platform film cooling hole 37 and the pressure side 29P of the second airfoil 29.

The angle labeled α, i.e. the angle between the chord CH of the airfoil profile 27, 29 and the tangential direction T-T, will be referred to herein as the stagger complementary angle.

The line Ahole is the projection on the surface of the respective inner platform 23 or outer platform 25 of the axis A (FIG. 7) of the cooling duct 38 ending at the platform film cooling hole 37. The angle β, aka hole compound angle and referred to as such herein, is the angle between the line Ahole and the tangential direction T-T.

According to an aspect of the present disclosure, the shape and position of the first airfoil 27 and second airfoil 29 are such that the angle α (i.e., the inclination of the chord of the airfoils 27, 29 with respect to the tangential direction T-T) is comprised between 0° and 85°. In preferred embodiments, such inclination is comprised between 0° and 80° and more preferably between 0° and 75°.

Moreover, the ratio between the width St of the vane passage and the axial chord Cax is comprised between 0 and 0.5, i.e.

$$0 < \frac{S_t}{C_{ax}} < 0.5$$

In preferred embodiments, the above-mentioned ratio is equal to or smaller than 0.45 and more preferably equal to or smaller than 0.4.

In a nozzle segment 11 characterized by the geometrical features of the airfoils 27, 29 defined above, the platform film cooling hole 37, or more precisely each platform film cooling hole 37, is positioned adjacent the pressure side 29P of the second airfoil 29, namely at a distance Δyhole therefrom in the tangential direction T-T, such that the ratio between said distance Δyhole and the distance Δy between the pressure side 29P of the second airfoil 29 and the suction side 27S of the first airfoil 27 in the tangential direction at the location of the platform film cooling hole 37 is comprised between 0 and 0.5, preferably between 0 and 0.45, and more preferably between 0 and 0.4, i.e.

$$0 < \frac{\Delta y_{hole}}{\Delta y} < d$$

where d is 0.5, preferably 0.45, more preferably 0.4.

In preferred embodiments, the platform film cooling hole 37, or each said platform film cooling hole 37 is preferably positioned deep into the hot gas flow passage 31, i.e., at a relatively large distance from the leading edges 27L, 29L and from the trailing edges 27T, 29T. More specifically, the ratio between the distance Cax, hole of the platform film cooling hole 37 and the axial chord Cax is preferably comprised between 0.15 and 0.95, i.e.

$$0.15 < \frac{C_{ax, \text{hole}}}{C_{ax}} < 0.95$$

more preferably $$0.2 < \frac{C_{ax, \text{hole}}}{C_{ax}} < 0.925$$

and even more preferably $$0.25 < \frac{C_{ax, \text{hole}}}{C_{ax}} < 0.9$$

The inclination δ (see FIG. 7) of axis A of the duct 38 surfacing on the surface 23A or 25A at the platform film cooling hole 37 is preferably comprised between 0° and 60°, preferably between 0° and 55°, more preferably between 0° and 50°. The hole compound angle β is preferably such that the difference between the hole compound angle and the stagger complementary angle α is less than −15°, or more than 25°, more preferably less than −7.5° or more than 27.5°, and even more preferably less than −5° or more than 30°.

The geometrical relationships outlined above result in a particularly efficient film cooling of the nozzle segment 11, as the air cooling film achieves regions of the vane passage 31 distant from the leading and trailing edges and near the pressure side of the second airfoil 29.

The above geometrical conditions can advantageously be met as the nozzle segment 11 is manufactured by additive manufacturing, since this manufacturing technology does not suffer the constraints and limitations of currently used technologies, such as in particular electro-discharge machining.

Exemplary embodiments have been disclosed above and illustrated in the accompanying drawings. It will be understood by those skilled in the art that various changes, omissions and additions may be made to that which is specifically disclosed herein without departing from the scope of the invention as defined in the following claims.

The invention claimed is:

1. A nozzle segment for a gas turbine, the nozzle segment comprising: an inner platform and an outer platform;
    a plurality of airfoils arranged between the inner platform and the outer platform; wherein the inner platform, the outer platform and the plurality of airfoils are manufactured by additive manufacturing; wherein each airfoil comprises a leading edge, a trailing edge, a pressure side and a suction side; wherein a hot gas flow passage is formed between the inner platform, the outer platform and each pair of sequentially arranged airfoils of said plurality of airfoils;
    a set of platform film cooling holes, including at least one platform film cooling hole on a surface of the inner platform or on the surface of the outer platform, facing said hot gas flow passage;
    wherein the cooling holes are shaped cooling holes having a non-circular and non-elliptical diverging shape,
    wherein a ratio between a distance in tangential direction of the platform film cooling hole from the pressure side of the respective airfoil and a width of the hot gas flow passage in tangential direction at the platform film cooling hole is comprised between 0 and 0.5,
    wherein a stagger complementary angle of each said airfoil is equal to or less than 85°, and
    wherein a ratio between a vane passage width and an axial chord of each said hot gas flow passage is comprised between 0 and 0.5.

2. The nozzle segment of claim 1, wherein a ratio between an axial distance of the platform film cooling hole from the leading edge and the axial chord is comprised between 0.15 and 0.95.

3. The nozzle segment of claim 1, wherein the platform film cooling hole has an axis that forms an angle equal to or less than 60° with a surface of the respective platform facing the hot gas flow passage.

4. The nozzle segment of claim 1, wherein a difference between a compound angle of the platform film cooling hole and the stagger complementary angle of the air foils is equal to or less than −15° or equal to or more than 25°.

5. The nozzle segment of claim 1, wherein the ratio between the distance in a tangential direction of the platform film cooling hole from the pressure side of the respective airfoil and a width of the hot gas flow passage in tangential direction at the platform film cooling hole is comprised between 0 and 0.45.

6. The nozzle segment of claim 1, wherein the stagger complementary angle is equal to or less than 80°.

7. The nozzle segment of claim 1, wherein the ratio between the vane passage width and the axial chord is comprised between 0 and 0.45.

8. The nozzle segment of claim 1, wherein the set of platform film cooling holes includes at least one platform film cooling hole on the inner platform and at least one platform film cooling hole on the outer platform.

9. The nozzle segment of claim 1, wherein the set of platform film cooling holes includes a plurality of platform film cooling holes on the inner platform sequentially arranged along each hot gas flow passage.

10. The nozzle segment of claim 1, wherein the set of platform film cooling holes includes a plurality of platform film cooling holes on the outer platform sequentially arranged along each hot gas flow passage.

11. A gas turbine engine comprising at least one nozzle segment according to claim 1.

12. The nozzle segment of claim 1, wherein a ratio between an axial distance of the platform film cooling hole from the leading edge and the axial chord is comprised between 0.2 and 0.925.

13. The nozzle segment of claim 1, wherein a ratio between an axial distance of the platform film cooling hole from the leading edge and the axial chord is comprised between 0.25 and 0.9.

14. The nozzle segment of claim 1, wherein the platform film cooling hole has an axis that forms an angle equal to or less than 55° with a surface of the respective platform facing the hot gas flow passage.

15. The nozzle segment of claim 1, wherein the platform film cooling hole has an axis that forms an angle equal to or less than 50° with a surface of the respective platform facing the hot gas flow passage.

16. The nozzle segment of claim 1, wherein a difference between a compound angle of the platform film cooling hole and the stagger complementary angle of the air foils is equal to or less than −7.5° or equal to or more than 27.5.

17. The nozzle segment of claim 1, wherein a difference between a compound angle of the platform film cooling hole and the stagger complementary angle of the air foils is equal to or less than −5° or equal to or more than 30°.

18. The nozzle segment of claim 1, wherein the ratio between the distance in a tangential direction of the platform film cooling hole from the pressure side of the respective airfoil and a width of the hot gas flow passage in tangential direction at the platform film cooling hole is comprised between 0 and 0.45.

19. The nozzle segment of claim 1, wherein the ratio between the distance in a tangential direction of the platform film cooling hole from the pressure side of the respective airfoil and a width of the hot gas flow passage in tangential direction at the platform film cooling hole is comprised between 0 and 0.40.

20. The nozzle segment of claim 1, wherein the stagger complementary angle is equal to or less than 75°.

\* \* \* \* \*